July 6, 1943. H. J. RAND 2,323,675
METHOD AND MEANS FOR DETERMINING AND REGULATING THE MASS OF
A COMPONENT GAS PER UNIT VOLUME OF A GASEOUS MIXTURE
Original Filed Sept. 18, 1937
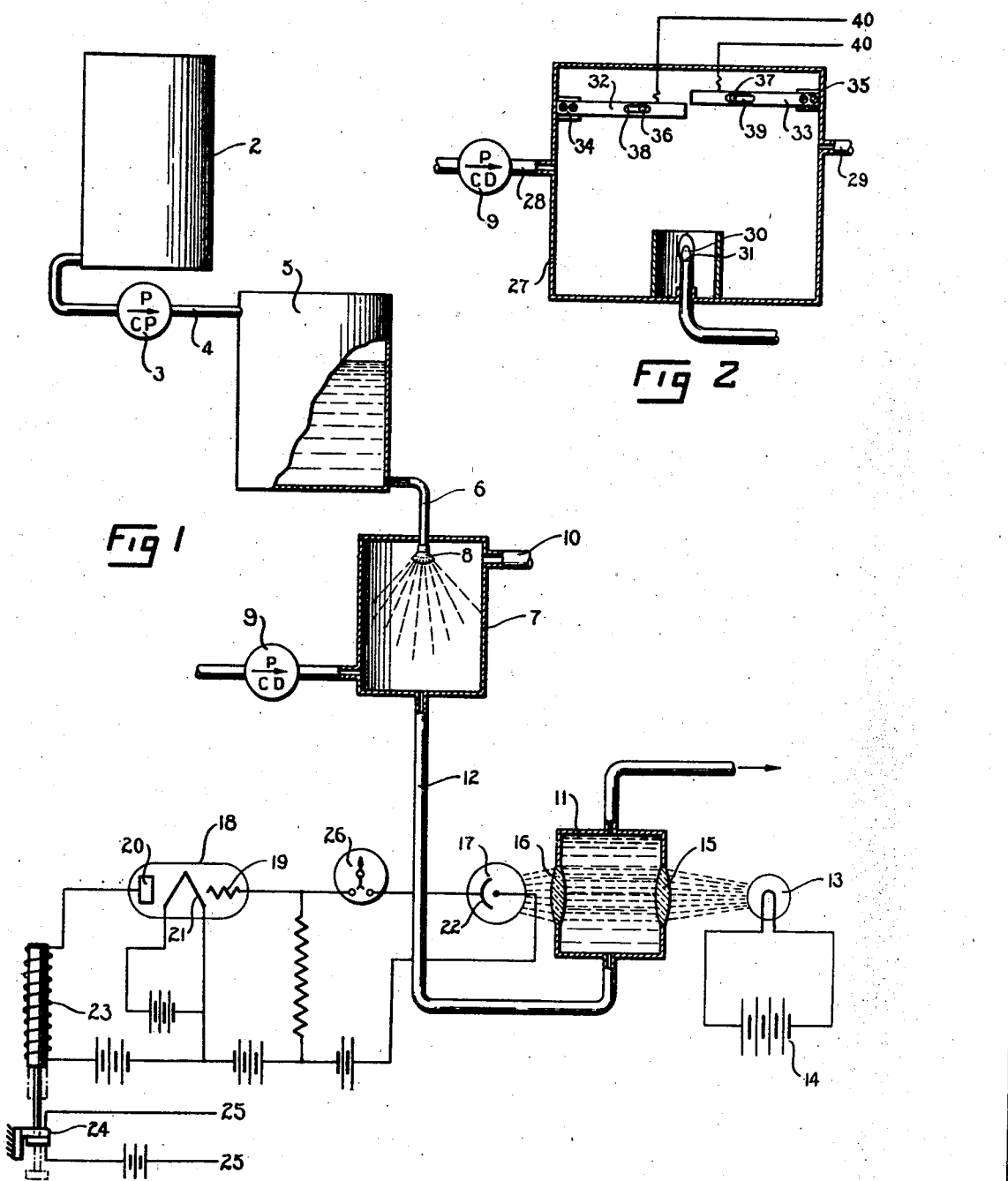
INVENTOR.
Henry James Rand
BY
F. Bascom Smith
ATTORNEY.

Patented July 6, 1943

2,323,675

UNITED STATES PATENT OFFICE 2,323,675

METHOD AND MEANS FOR DETERMINING AND REGULATING THE MASS OF A COMPONENT GAS PER UNIT VOLUME OF A GASEOUS MIXTURE

Henry James Rand, New York, N. Y., assignor to Bendix Aviation Corporation, South Bend, Ind., a corporation of Delaware Original application September 18, 1937, Serial No. 164,488, now Patent No. 2,299,109, dated October 20, 1942. Divided and this application January 7, 1942, Serial No. 425,822

17 Claims. (Cl. 128—191)

This invention relates to apparatus for controlling, in a mixture of gases, the mass of a component gas per unit volume of the mixture and more particularly to apparatus for automatically controlling the above ratio or tension of oxygen in the atmosphere under varying pressure and temperature conditions.

This application is a division of Henry J. Rand application Serial No. 164,488, filed September 18, 1937, for "Oxygen regulating device," now Patent No. 2,299,109, dated October 20, 1942.

In high altitude flying and under conditions of low or widely varying barometric pressure, the problem of breathing in rarefied atmospheres is one of long standing. The deficiency of oxygen has been supplied under such conditions by means of a face mask connected to an oxygen tank or some direct connection between an oxygen supply and the mouth of the user. This method has the disadvantage of failing to supply the body with ample oxygen at high altitudes and creates the symptoms of oxygen want, i. e., cramps or burning and tingling in the hands and feet. In individuals afflicted with angina pectoris or other heart ailments this oxygen want may result in death.

An attempt has been made to compensate for the oxygen loss met in high altitude flights under low barometric pressures by maintaining normal atmospheric pressure within the cabin or chamber of the aircraft. This method has proved impractical for aircraft because of the prohibitive weight of the structure which would be capable of withstanding such pressure from within when the actual atmospheric or external pressure is low and also because of the tremendous drain upon the motor energy when required to maintain this pressure.

Another problem of oxygen tension control in a given atmosphere is in connection with the therapeutic use thereof wherein it is necessary for a patient to live in an atmosphere of increased oxygen content at a predetermined tension. Devices have been designed to determine the oxygen percentage of the atmosphere but no means have heretofore been found automatically to control the tension and to give a continuous record thereof.

It is accordingly one of the objects of this invention to provide novel means for automatically controlling the tension of a gas, i. e., in a mixture of gases, the mass of a component gas per unit volume of the mixture under varying pressure and temperature conditions.

Another object is to provide novel means to maintain automatically a constant normal oxygen tension in the atmosphere of a chamber, room, or an aircraft cabin under widely varying barometric pressures so that at high altitudes in rarefied atmospheres respiration will be safe for the passengers within said chamber or cabin.

A further object is to provide novel means for automatically maintaining an oxygen enriched atmosphere for therapeutic purposes.

An additional object of the present invention is to provide novel means for controlling the oxygen tension in the atmosphere within a building or house in order to adjust same to promote the comfort and health of the occupants.

A further object of the invention is to eliminate the problem of constructing an aircraft cabin strong enough to withhold normal atmospheric pressure at high altitudes.

The above and further objects and novel features of the invention will more fully appear from the following detailed description when the same is read in connection with the accompanying drawings. It is to be expressly understood, however, that the drawing is for the purpose of illustration only and are not intended as a definition of the limits of the invention, reference for this latter purpose being had primarily to the appended claims.

In the drawing, wherein like reference characters refer to like parts through the several views, Fig. 1 is a schematic diagram of one embodiment of the present invention; and, Fig. 2 is a schematic diagram of a second embodiment of the invention.

In order to demonstrate that a normal oxygen tension of the atmosphere surrounding the body is necessary for comfortable breathing, at low temperatures and barometric pressures, it must be remembered that respiration of the human body takes place by means of both the skin and lungs with normally approximately 2 per cent taking place through the skin and 98 per cent in the lungs when the oxygen tension of the surrounding air is "normal." Normal oxygen tension of the air is defined as the mass of oxygen per cubic foot of air or the number of molecules of oxygen per unit volume of air at sea level and at a temperature of 0° C. Said tension under these conditions will enable normal comfortable breathing through both the skin and lungs. The skin must be considered as a porous membrane through which oxygen may pass from regions of greater concentration to those of less concentration. Consequently, the skin or cutaneous respiration varies with the oxygen tension of the surrounding atmosphere. If the oxygen tension is lower than normal, less oxygen will pass through the skin. The tension may fall below that of the tissue fluids and instead of oxygen entering the body from without it will escape therefrom through the skin. Accordingly, if the oxygen tension of the surrounding atmosphere is low and that of the air taken through the mouth into the lungs is high, the oxygen will quickly seep out through the skin, causing serious danger and discomfort due to a deficiency of said gas in the extremities of the body. Fliers at very high altitudes find that interrupting the oxygen supply for thirty or forty seconds will cause unconsciousness, whereas at low altitudes the supply may be cut off for three or four minutes before loss of consciousness. This indicates that the life sustaining oxygen seeps almost immediately through the permeable skin and is lost when the artificially induced oxygen tension within the body is higher than that of the atmosphere. Therefore, equal normal oxygen tension should be maintained not only within the body but in the surrounding atmosphere.

The relation between oxygen tension, partial oxygen pressure (partial oxygen pressure is that portion of the pressure of the atmosphere which is due to the oxygen content of the air) and temperature may be expressed as follows:

1. $$\frac{Mo}{V\text{ (air)}} \propto \frac{Po}{T}$$

or $$\frac{Mo}{V\text{ (air)}} \propto Po \text{ (where T is constant)}$$

where $Mo$ = Mass of oxygen
$V$ (air) = Volume of air
$Po$ = Partial pressure of oxygen
$T$ = Absolute temperature NOTE.—The per cent volume of oxygen in air is constant at approx. 20 per cent.

2. $$\frac{Mo}{V\text{ (air)}} = O_t \text{ (oxygen tension)}$$

3. $$\therefore O_t \propto \frac{Po}{T}$$

From the above, it is seen that oxygen tension is a function of the partial oxygen pressure, only if the temperature is held constant. For example, consider a condition at sea level where the barometric pressure is approximately 15 pounds per square inch and the temperature is 0° C. The per cent volume of oxygen in air is constant at approximately 20 per cent. Therefore, since the atomic weights of nitrogen and oxygen are nearly equal, the partial pressure of oxygen will be about 20 per cent of the total or about 3 pounds per square inch. This partial pressure at this temperature and altitude is a direct function of the oxygen tension. As the altitude increases and the barometric pressure falls, the per cent volume of oxygen will remain the same and the partial pressure will continually decrease remaining approximately 20 per cent of the barometric pressure. The oxygen tension will diminish with the partial pressure provided the temperature remains constant. Consequently, if the barometric pressure falls to 5 pounds per square inch, the partial pressure of oxygen will be approximately one pound per square inch. Respiration in this atmosphere would be dangerous if not impossible; accordingly, the oxygen partial pressure should be raised to 3 pounds per square inch at the above constant temperature. This will restore a normal oxygen tension and enable comfortable breathing. However, under actual conditions, the temperature does not remain constant and hence the oxygen tension is not a function of the partial oxygen pressure alone but is modified also by changes in air density resulting from temperature change.

From this, it is seen that in order to hold a constant oxygen tension, it is not sufficient to maintain a constant per cent volume of oxygen in the mixture, because obviously as the temperature and barometric pressure decrease with the increase in altitude, said per cent volume will remain the same but the mass of oxygen per unit volume of air will change with the changes in pressure and temperature. Consequently, a device must be used which is responsive only to changes in oxygen mass per unit volume of air. It is desirable to maintain per unit volume of air the number of molecules of oxygen at the optimum level to meet body requirements regardless of the changes in temperature and barometric pressure.

The embodiments of the present invention illustrated in the accompanying drawing are in the form of apparatus which will control the oxygen tension of the atmosphere, for example, within a chamber or within the cabin of an aircraft under varying pressure and temperature conditions encountered in flight. For reasons previously shown, it is desirable and necessary for safe and comfortable respiration at high altitudes to maintain within the aircraft a substantially constant tension equal to that which exists at sea level. Accordingly, the devices comprise novel means responsive to the mass of oxygen per unit volume of air to control an oxygen supply which is able to compensate for the change in oxygen tension as said ratio varies with the change in barometric pressure and temperature.

Since the rate of oxidation of a substance undergoing oxidation in a gaseous mixture is a function of the oxygen tension, said means comprises a device which measures said rate of oxidation and translates same into electric energy which controls an oxygen supply to said atmosphere.

In the form illustrated in Fig. 1, the device is constituted by novel means to measure the rate of oxidation of a liquid in a gaseous mixture and to control the oxygen tension of the mixture thereby. For purposes of the present embodiment, the properties of said liquid must be such that the intensity of light transmitted through a stream of the liquid varies as a function of its rate of oxidation. Sodium hyposulphide or pyrogal, for example, is a suitable liquid because it is colorless when unoxidized and an opaque brown when fully oxidized. Therefore, when a unit volume of said liquid is exposed for a unit length of time to a unit volume of the gaseous mixture, the opaqueness of the liquid will be a measure of its rate of oxidation and hence a measure of the oxygen tension.

The novel means provided to treat said liquid in the above manner comprise a tank 2 containing an inert gas, as nitrogen or neon. This gas is caused to flow by a constant-pressure-flow metering device 3 through tube 4 to exert a constant pressure upon the liquid in tank 5 and to cause same to flow at a constant rate regardless of atmospheric pressure through a tube 6 which is in communication with an oxidizing chamber 7 wherein a nozzle 8 attached to the end of tube 6, in order to aid in the oxidation, sprays said liquid into finely divided particles. Through this spray is forced the air or gaseous mixture, the oxygen tension of which is to be controlled. By means of a constant flow pump 9 a gaseous mixture or the air from the chamber or cabin in question is pumped into the oxidizing chamber 7 and is directed through said spray in such a manner that there is an intimate mingling of said mixture or air and the particles of liquid. After passing through the spray, the air passes through outlet 10 to an exhaust (not shown) or it may be recovered and rinsed by a suitable process. The liquid undergoing this process will become partially oxidized and, as before mentioned, the opaqueness thereof will be a function of the rate of oxidation, i. e., a function of the oxygen tension of the gaseous mixture.

Novel means are provided to translate the variations in shade of the oxidized liquid into electric energy suitable for controlling an oxygen supply, comprising a chamber 11 into which flows, through tube 12, a stream of said oxidized liquid and through which is passed a beam of light of constant initial intensity from an electric lamp 13 connected to a suitable energy source 14. The beam passes through the liquid stream in said chamber by means of lenses 15 and 16 and impinges upon a photo-electric cell 17. The intensity of the emerging beam will be a function of the opaqueness of the liquid. Hence, the output of the photo-electric cell energized by said beam will be a similar function and will vary as the oxygen tension of the gaseous mixture passing through chamber 7.

The minute output current of the photo-electric cell must be amplified to enable it to govern suitable switching means for controlling the oxygen supply. The amplifying means are constituted by the circuit as shown which may employ one or a plurality of amplifying stages. In the present form, a single stage is shown comprising thermionic tube 18 consisting of a grid 19, a plate 20 and a filament 21. The plate 22 of the photo-electric cell 17 is connected to the grid 19 of said tube, the amplifying action of which depends upon the ability of the grid 19 to control the current of the tube plate 20 in spite of opposing variations in plate voltage. A current is thus produced which is a function of the oxygen tension and in the present invention is inversely proportional to said tension. This current is sufficient to operate the switching means which control by valve means (not shown) the oxygen supply. Said switching means comprises a solenoid 23 actuated by the plate current of the thermionic tube circuit. Said solenoid controls a relay switch 24 which opens and closes the circuit 25 governing the valve means for the oxygen supply. The amplifying circuit may be adjusted to cause oxygen to flow whenever the photo-electric cell current reaches a predetermined point.

In order to provide a direct indication of the oxygen tension, a galvanometer 26 is inserted in the grid circuit of the amplifier and is calibrated in suitable units for measuring said tension.

In operation, the apparatus is placed, for example, within a chamber or an aircraft cabin wherein the oxygen tension is to be regulated, said chamber or cabin being of substantially gas-tight construction with suitable means to supply air or a gaseous mixture thereto from an external source, and means within said chamber remote from the supply inlet to exhaust the mixture. An inert gas confined in tank 2 is caused to flow by constant-pressure-flow meter 3 through tube 4, into tank 5, the liquid contents of which it keeps under constant pressure and causes a constant flow of the said liquid therefrom through tube 6 into chamber 7 wherein a nozzle 8 attached to the end of tube 6 sprays the liquid into finely divided particles. The liquid, for example, sodium hyposulphide or pyrogal, is of such a nature that it is colorless when unoxidized but progressively changes in shade to complete opaqueness as the extent of oxidation increases. Through this spray, a gas pump 9 forces a constant flow of the air or gaseous mixture, the oxygen tension of which is to be regulated. Therefore, during this process unit volumes of the liquid are exposed for unit lengths of time to unit volumes of the mixture of gases and said liquid is oxidized at a rate proportional to the mass of oxygen per unit volume of said mixture, i. e., at a rate proportional to the oxygen tension. Accordingly, the opaqueness of the liquid will be a function of the oxygen tension. The oxidized liquid then passes through the tube 12 to chamber 11 which is equipped with lenses 15 and 16 at opposite sides thereof. An electric lamp 13 connected to a suitable source of electric energy 14 emits a beam of constant intensity which passes through said lenses and stream of liquid and falls upon a photo-electric cell 17. The intensity of the light beam emerging from the final lens is a function of the opaqueness of the liquid stream and hence also a function of the oxygen tension. Therefore, the cell output current will be a similar function. The cell current is amplified in the circuit employing thermionic tube 18 so that changes in beam intensity are translated into electric impulses of sufficient strength to control a solenoid 23 which controls relay switch 24 which, in turn, governs suitable oxygen supply valve means (not shown). The photo-electric cell current may be read upon galvanometer 26 not necessarily in milliamperes but in suitable units of oxygen tension.

The amplifying circuit may be adjusted to maintain any desired grid current and hence any desired oxygen tension.

For example, suppose a normal oxygen tension will oxidize the liquid of tank C to an opaqueness which will permit enough light from lamp 13 to pass through chamber 11 to produce a current of Y milliamps in the photo-electric cell 17 measured in the galvanometer 26. If it is desired to maintain normal oxygen tension, the amplifying circuit is adjusted to allow sufficient current to flow to move solenoid 23 to close the oxygen pump control circuit if the grid current goes above Y milliamps. Said grid current in the embodiment shown varies inversely as the oxygen tension.

As the oxygen tension decreases, due, for example, to increased altitude, the rate of oxidation of the liquid agent decreases; consequently, the degree of opaqueness of said liquid will decrease and the intensity of the beam from lamp 13 passing therethrough will increase. If said intensity is sufficient to produce a current greater than Y milliamps in the photocell 17 immediately the plate current is increased sufficiently to actuate the solenoid 23 to close switch 24 which will operate the oxygen supply pump until the oxygen tension within the chamber is restored to normal and normal oxidation and opaqueness is regained and the grid current is again Y milliamps.

A second embodiment of the invention is illustrated in Fig. 2 wherein the heat produced by a flame burning in the atmosphere, the oxygen tension of which is to be regulated, causes, at a predetermined point, expanding metal strips to complete an electric circuit and thus to energize the apparatus which controls an oxygen source.

The second embodiment, illustrated in Fig. 2, comprises a suitable insulated oxidizing chamber 27 having an air intake port 28 and an exhaust opening 29. By means of the constant flow pump 9 a gaseous mixture or air is forced into chamber 27. The stream of air flowing through this chamber supports the combustion of a suitable substance 30 which may be either solid, gaseous or liquid and which is led into chamber 27 through an opening 31 therein. The heat from this burning substance will be produced at a rate which is a function of the oxygen tension at the atmosphere supporting the combustion if the substance is under normal conditions adapted for uniform combustion. Consequently, the temperature within chamber 27 will be a function of said tension and will cause metal strips 32 and 33 to expand and contract as a similar function and to complete an electric circuit at a predetermined temperature. In the form shown, strips 32 and 33 are longitudinally opposed, and fixedly mounted at the outer extremities thereof at 34 and 35, respectively. Means are provided for permitting expansion of the strips comprising pins 36 and 37 which act in slots 38 and 39 located at the inner extremities of the strips, respectively. Electric leads 40, 40 are connected to said strips and when contact is made conduct the current which actuates the valve mechanism which, in turn, governs the oxygen supply to the atmosphere undergoing regulation.

In operation, as before mentioned, the apparatus is placed, for example, within a chamber or an aircraft cabin wherein the oxygen tension is to be regulated. A constant flow of air is forced through passage 28 into chamber 27 by a constant flow pump 9. Consequently, unit volumes of air will give up portions of their oxygen content during unit lengths of time to support the flame and the heat therefrom will be produced at a rate which is a function of the oxygen tension of said unit volumes of air. Therefore, the temperature in chamber 27 and the expansion of metal strips 32 and 33 will be a similar function. At a predetermined temperature, said strips will contact one another and complete an electric circuit which controls an oxygen source to the atmosphere to be regulated. In the form shown, when at low altitudes, the oxygen content will be highest and the flame will reach the highest temperatures; consequently strips 32 and 33 will be in contact and the electric control means (not shown) must hold the oxygen valve in the closed position. However, as the oxygen tension decreases the flame will become weaker and the metal strips will separate and the oxygen valve (not shown) will be opened until the atmosphere is sufficiently enriched to cause the flame to again close the contact between the expanding strips.

There is thus provided a novel apparatus for governing in a gaseous mixture the mass of oxygen per unit volume of the mixture. Said apparatus is simple and automatic in operation, adapted for easy installation within a limited space, light in construction, and may be used to maintain a constant oxygen tension of the atmosphere within a chamber or the cabin of an aircraft in the rarefied atmospheres at high altitudes. The apparatus can thus insure safe and comfortable respiration within said chamber or cabin regardless of the altitude and barometric pressure. The apparatus further eliminates the necessity for added weight in aircraft cabin construction which would be necessary if atmospheric pressure were to be maintained therein. The small added pressure due to added oxygen within the cabin requires only that the cabin walls be substantially gas-tight. The apparatus is novelly adapted not only for aircraft use but may also be employed in the home or in a building to artificially enrich the atmosphere therein and maintain the same at a slightly higher oxygen tension to promote the health and comfort of the occupants.

Although only two embodiments of the invention have been illustrated and described in detail, it is to be expressly understood that the same is not limited thereto. For example, in the second embodiment, the heat of combustion is used to expand longitudinally opposed metal rods and to complete an electric contact therebetween. However, this construction may be replaced by a bimetallic rod which, upon changes in temperature, becomes distorted and opens or closes an electric contact. Various changes also may be made in the design and arrangement of the parts illustrated, as will now be apparent to those skilled in the art. For a definition of the limits of the invention, reference will be had primarily to the appended claims.

What is claimed is:

1. In a device for controlling in a gaseous mixture the mass of a component gas per unit volume of said mixture, a compartment having an inlet and an outlet for said mixture, means for continuously supplying said mixture to said compartment at a uniform volumetric rate, means for continuously supplying a substance to said compartment which is adapted to chemically combine with said component gas at a rate which is a function of said mass per unit volume, said mixture being continuously discharged from said compartment through said outlet, a source of said component gas, and means for controlling the flow of said gas from said source into said mixture in accordance with said rate of chemical combination.

2. In a device for controlling in a gaseous mixture the mass of a component gas per unit volume of said mixture, a compartment having an inlet and an exhaust for said mixture, means for continuously circulating said mixture through said compartment at a constant volumetric rate, means for continuously supplying a substance to said compartment which is adapted to chemically combine with said component gas at an instantaneous rate which is a function of said mass per unit volume of the mixture, a source of said component gas, and means responsive to said rate to control the flow of said gas from said source to said mixture.

3. In an oxygen tension control device containing a continuous supply of a gaseous mixture including oxygen, means for continuously supplying an oxidizable substance to said device for oxidation in said mixture, a source of oxygen, and means controlled in accordance with the instantaneous rate of oxidation of said substance in said mixture to govern the flow of oxygen from said source to said mixture.

4. In apparatus of the class described, a mixing chamber, means for continuously circulating a gaseous mixture containing oxygen through said chamber, the latter having an outlet for said mixture, a source of a liquid substance which varies from a minimum opaqueness when unoxidized to a maximum opaqueness when fully oxidized, means for continuously supplying said liquid substance to said chamber for oxidation in said mixture, means for continuously discharging said substance from said chamber through a second outlet therein, a source of oxygen, and means controlled in accordance with the opaqueness of the liquid discharged from said chamber for controlling theh flow of oxygen from said second-named source.

5. In apparatus for controlling the oxygen tension in a gaseous mixture, a mixing chamber, means for continuously circulating a quantity of said mixture through said chamber at a uniform volumetric rate, a source of a liquid substance which varies from a minimum opaqueness when unoxidized to a maximum opaqueness when fully oxidized, means for maintaining said substance under a uniform pressure at said source, means for continuously supplying liquid from said source to said chamber for oxidation in said mixture, means for continuously discharging said substance from said chamber, a source of oxygen, and means controlled in accordance with the opaqueness of the liquid discharged from said chamber for controlling the flow of oxygen from said source to said mixture.

6. In apparatus for controlling the oxygen tension in a gaseous mixture, a mixing chamber, means for continuously circulating a predetermined volume of said mixture through said chamber per unit of time, a source of liquid, the opaqueness of which is dependent upon the degree of oxidation thereof, means for maintaining said liquid under a uniform pressure at said source, means for continuously spraying said liquid into said chamber for oxidation in said mixture, means for continuously discharging said liquid from said chamber, a source of oxygen, a lamp for producing a beam of light of constant intensity, a photo-electric cell, means for directing said beam through the liquid discharged from said chamber and upon said cell, and means responsive to the electrical output of said cell for controlling the flow of oxygen from said second-named source to said mixture.

7. In apparatus for controlling the oxygen tension in a gaseous mixture, a mixing chamber, means for continuously forcing a supply of said mixture through said chamber at a constant volumetric rate, means including constant pressure means for supplying a liquid to said chamber, said liquid being adapted to vary in opaqueness in accordance with the degree of oxidation thereof, means for continuously conducting said liquid from said chamber, a source of oxygen, and means controlled in accordance with the opaqueness of the liquid discharged from said chamber for controlling the flow of oxygen from said source to said mixture.

8. The method of controlling the oxygen tension in a gaseous mixture comprising the steps of maintaining a continuous constant-volume circulation of said mixture through a chamber, continuously supplying a substance to said chamber which is oxidizable in said mixture at a rate which is a function of the mass of oxygen per unit volume of said mixture, translating said rate into electrical energy, and controlling the flow from a source of oxygen to said mixture in accordance with said electrical energy.

9. The method of controlling the oxygen tension in a gaseous mixture which includes the steps of maintaining a continuous constant-volume circulation of said mixture through a chamber, spraying a liquid into said chamber for oxidation in said mixture, the opaqueness of said liquid varying in accordance with the degree of oxidation thereof, and controlling the flow of oxygen from a source of oxygen to said mixture in accordance with the opaqueness of the liquid discharged from said chamber.

10. In apparatus of the class described, an oxidizing chamber having an inlet for an oxidizable substance and an inlet for a gaseous mixture containing oxygen, means for feeding said substance at a predetermined rate to said chamber, means for feeding the mixture at a predetermined rate to the chamber, said substance undergoing oxidation and producing heat at a rate responsive to the mass of oxygen per unit volume of mixture, a container of oxygen under pressure, electrically controllable means for governing a flow of oxygen from said container, an electric circuit for governing the last-named means, and heat responsive expansible and contractible means for governing said circuit, said expansible and contractible means being exposed to the heat of oxidation of said substance.

11. In a device to control in a gaseous mixture the mass of oxygen per unit volume of said mixture, an oxidizing chamber, there being a substance in said chamber undergoing combustion supported by the oxygen of said mixture, said combustion producing heat in response to the oxygen tension of said mixture, a container of oxygen, electrically operable means for controlling a flow of oxygen from said container, an electric circuit for governing the last-named means, and an expansible metallic element electrically connected in said circuit exposed to said heat and adapted for "completing" said circuit when said heat goes below a predetermined value and for "breaking" said circuit when said heat goes above said value.

12. In apparatus of the class for controlling in a gaseous mixture the mass of oxygen per unit volume of said mixture, employing a substance undergoing combustion supported by the oxygen in said mixture, the combustion producing heat at a rate in response to the oxygen tension of said mixture, a container of oxygen from said container, an electric circuit for controlling the last-named means, the combination with said circuit of an expansible metallic element connected in the circuit for governing a flow of current therein, said element being exposed to said heat and adapted for governing the circuit in response thereto.

13. In apparatus of the class having a container of oxygen under pressure, electrically operable means for controlling a flow of oxygen from the source to a region containing a gaseous mixture including oxygen, there being a substance undergoing combustion in said mixture producing heat as a function of the oxygen tension of the mixture, an electric circuit for controlling said electrically operable means, the combination with said circuit of an expansible metallic switch element connected electrically therein for controlling a flow of current in the circuit, said element being exposed to said heat and adapted for remaining open at predetermined values of heat and remaining closed at other predetermined values of heat.

14. In apparatus of the class described, a mixing chamber, means for continuously circulating a gaseous mixture containing oxygen through said chamber, the latter having an outlet for said mixture, a source of a liquid substance which varies from a minimum opaqueness when unoxidized to a maximum opaqueness when fully oxidized, means for continuously supplying said liquid substance at a uniform volumetric rate to said chamber for oxidation in said mixture, means for continuously discharging said substance from said chamber through a second outlet therein, a source of oxygen, and means controlled in accordance with the opaqueness of the liquid discharged from said chamber for controlling the flow of oxygen from said second-named source.

15. In apparatus for controlling the oxygen tension in a gaseous mixture, a mixing chamber, means for continuously circulating a quantity of said mixture through said chamber at a uniform volumetric rate, a source of a liquid substance which varies from a minimum opaqueness when unoxidized to a maximum opaqueness when fully oxidized, means for maintaining said substance under a uniform pressure at said source, means for continuously supplying liquid at a uniform volumetric rate from said source to said chamber for oxidation in said mixture, means for continuously discharging said substance from said chamber, said last-named means being separate from the means for continuously circulating the gaseous mixture through said chamber, a source of oxygen, and means controlled in accordance with the opaqueness of the liquid discharged from said chamber for controlling the flow of oxygen from said source to said mixture.

16. In apparatus for controlling the oxygen tension in a gaseous mixture, a mixing chamber, means for continuously circulating a predetermined volume of said mixture through said chamber per unit of time, a source of liquid, the opaqueness of which is dependent upon the degree of oxidation thereof, means for maintaining said liquid under a uniform pressure at said source, means for continuously spraying said liquid from said last-named means at a uniform rate into said chamber for oxidation in said mixture, means for continuously discharging said liquid from said chamber, said last-named means being separate from the means for continuously circulating the gaseous mixture through said chamber, a source of oxygen, a lamp for producing a beam of light of constant intensity, a photoelectric cell, means for directing said beam through the liquid discharged from said chamber and upon said cell, and means responsive to the electrical output of said cell for controlling the flow of oxygen from said second-named source to said mixture.

17. In apparatus of the class described, a mixing chamber, means for continuously circulating a gaseous mixture containing oxygen through said chamber, the latter having an outlet for said mixture, a reservoir for a liquid substance which varies from a minimum opaqueness when unoxidized to a maximum opaqueness when fully oxidized, means for continuously supplying said liquid substance to said chamber for oxidation in said mixture, means for subjecting said liquid substance to a uniform pressure in its reservoir whereby the liquid substance is supplied at a uniform volumetric rate to said chamber, said last-named means comprising a container of inert gas, and means for supplying said gas to said reservoir at a constant pressure, means for continuously discharging said substance from said chamber through a second outlet therein, a source of oxygen, and means controlled in accordance with the opaqueness of the liquid discharged from said chamber for controlling the flow of oxygen from said source.

HENRY JAMES RAND.